US012802197B2

(12) United States Patent
Ikoma et al.

(10) Patent No.: US 12,802,197 B2
(45) Date of Patent: Nov. 17, 2026

(54) TIRE INSPECTION SUPPORT APPARATUS AND METHOD, AND COMPUTER READABLE MEDIUM

(71) Applicant: NEC Corporation, Tokyo (JP)

(72) Inventors: Shigeki Ikoma, Tokyo (JP); Yuka Oshima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 217 days.

(21) Appl. No.: 18/717,557

(22) PCT Filed: Dec. 24, 2021

(86) PCT No.: PCT/JP2021/048385
§ 371 (c)(1),
(2) Date: Jun. 7, 2024

(87) PCT Pub. No.: WO2023/119663
PCT Pub. Date: Jun. 29, 2023

(65) Prior Publication Data
US 2025/0045897 A1 Feb. 6, 2025

(51) Int. Cl.
*G06T 7/00* (2017.01)
*G01M 17/02* (2006.01)
*G06V 10/46* (2022.01)

(52) U.S. Cl.
CPC ........... *G06T 7/0004* (2013.01); *G01M 17/02* (2013.01); *G06V 10/467* (2022.01); *G06T 2207/30252* (2013.01)

(58) Field of Classification Search
None
See application file for complete search history.

(56) References Cited

U.S. PATENT DOCUMENTS 5,267,330 A * 11/1993 Masuda ............. H04N 1/40062 382/270
5,528,290 A * 6/1996 Saund .................... G06V 10/10 382/284
2004/0252875 A1* 12/2004 Crandall ............. G02B 21/245 382/284
(Continued)

FOREIGN PATENT DOCUMENTS

EP 3 614 097 A1 * 2/2020 ............. G01B 11/00
JP 2003-035528 A 2/2003
(Continued)

OTHER PUBLICATIONS

International Search Report for PCT Application No. PCT/JP2021/048385, mailed on Mar. 22, 2022.

*Primary Examiner* — Sath V Perungavoor
(74) *Attorney, Agent, or Firm* — Sughrue Mion, PLLC

(57) ABSTRACT

A tire inspection support apparatus includes: a first detection unit that detects a first area including a cracked part candidate in a tire through first image processing performed on a photographed image of the tire; a generation unit that generates an image to be processed obtained by extracting a partial image corresponding to the first area from the photographed image; a second detection unit that detects a second area showing the cracked part from the first area through second image processing performed on the image to be processed; and a calculation unit that calculates an index value for the cracked part in the tire based on the second area.

9 Claims, 13 Drawing Sheets

(56) References Cited

U.S. PATENT DOCUMENTS

| | | | | |
|---|---|---|---|---|
| 2005/0052468 | A1* | 3/2005 | Kroon | H04N 1/405 345/613 |
| 2005/0084175 | A1* | 4/2005 | Olszak | H04N 1/3876 382/284 |
| 2009/0195801 | A1* | 8/2009 | Malik | H04N 1/00002 358/1.9 |
| 2011/0115896 | A1* | 5/2011 | Doehring | H04N 7/183 382/128 |
| 2013/0081982 | A1* | 4/2013 | Tanaka | G01N 21/85 209/552 |
| 2016/0180149 | A1* | 6/2016 | Yesugade | G06T 7/20 382/103 |
| 2018/0232601 | A1* | 8/2018 | Feng | G06T 7/0004 |
| 2020/0149997 | A1* | 5/2020 | Demirel | G06T 7/55 |
| 2020/0204777 | A1* | 6/2020 | Goldman | H04N 13/254 |
| 2021/0142467 | A1* | 5/2021 | Burkhardt | B23K 31/12 |
| 2022/0036576 | A1* | 2/2022 | Mian | G06V 10/143 |
| 2024/0118453 | A1* | 4/2024 | Sun | G02B 1/002 |

FOREIGN PATENT DOCUMENTS

| | | | | |
|---|---|---|---|---|
| JP | 2015161575 | A * | 9/2015 | B60C 19/00 |
| JP | 2019-035626 | A | 3/2019 | |
| JP | 2019-132644 | A | 8/2019 | |
| JP | 2019-202729 | A | 11/2019 | |
| KR | 10-2019-0094005 | A | 8/2019 | |

* cited by examiner

TIRE INSPECTION SUPPORT APPARATUS AND METHOD, AND COMPUTER READABLE MEDIUM

This application is a National Stage Entry of PCT/JP2021/048385 filed on Dec. 24, 2021, the contents of all of which are incorporated herein by reference, in their entirety.

TECHNICAL FIELD

The present invention relates to a tire inspection support apparatus, a method, and a program, and in particular, to a tire inspection support apparatus, a method, and a program for supporting an inspection of a tire.

BACKGROUND ART

Regarding a determination as to whether a tire requires maintenance work or not, the criterion based on which the determination is made varies according to the driver or the mechanic, so it has been desired to introduce an objective indicator. Patent Literature 1 discloses a technology for detecting a crack in a tire by extracting an area where grooves are formed in the tire from a depth map or the like of the tire and binarizing a photographed image of that area, and for then evaluating the deterioration of the tire from the size of the crack.

CITATION LIST

Patent Literature

Patent Literature 1: Japanese Unexamined Patent Application Publication No. 2015-161575

SUMMARY OF INVENTION

Technical Problem

Note that to determine the deterioration of a tire, it is necessary to take the degree of cracks into consideration. Further, there is room for improvement in the accuracy of the technology for detecting a cracked part in a tire from a photographed image of the tire. Note that in the technology disclosed in Patent Literature 1, cracks formed in areas other than the area where grooves are formed are not detected.

In view of the above-described problem, an object of the present disclosure is to provide a tire inspection support apparatus, a method, and a program for improving the accuracy of the detection of a cracked part in a tire from a photographed image of the tire.

Solution to Problem

A tire inspection support apparatus according to a first aspect of the present disclosure includes:

- first detection means for detecting a first area including a cracked part candidate in a tire through first image processing performed on a photographed image of the tire;
- generation means for generating an image to be processed obtained by extracting a partial image corresponding to the first area from the photographed image;
- second detection means for detecting a second area showing the cracked part from the first area through second image processing performed on the image to be processed; and
- calculation means for calculating an index value for the cracked part in the tire based on the second area.

In a tire inspection support method according to a second aspect of the present disclosure, a computer:

- detects a first area including a cracked part candidate in a tire through first image processing performed on a photographed image of the tire;
- generates an image to be processed obtained by extracting a partial image corresponding to the first area from the photographed image;
- detects a second area showing the cracked part from the first area through second image processing performed on the image to be processed; and
- calculates an index value for the cracked part in the tire based on the second area.

A non-transitory computer readable medium storing an inspection support program according to a third aspect of the present disclosure causes a computer to perform:

- a first detection process for detecting a first area including a cracked part candidate in a tire through first image processing performed on a photographed image of the tire;
- a generation process for generating an image to be processed obtained by extracting a partial image corresponding to the first area from the photographed image;
- a second detection process for detecting a second area showing the cracked part from the first area through second image processing performed on the image to be processed; and
- a calculation process for calculating an index value for the cracked part in the tire based on the second area.

Advantageous Effects of Invention

According to the present disclosure, it is possible to provide a tire inspection support apparatus, a method, and a program for improving the accuracy of the detection of a cracked part in a tire from a photographed image of the tire.

EXAMPLE EMBODIMENT

Figure 1:
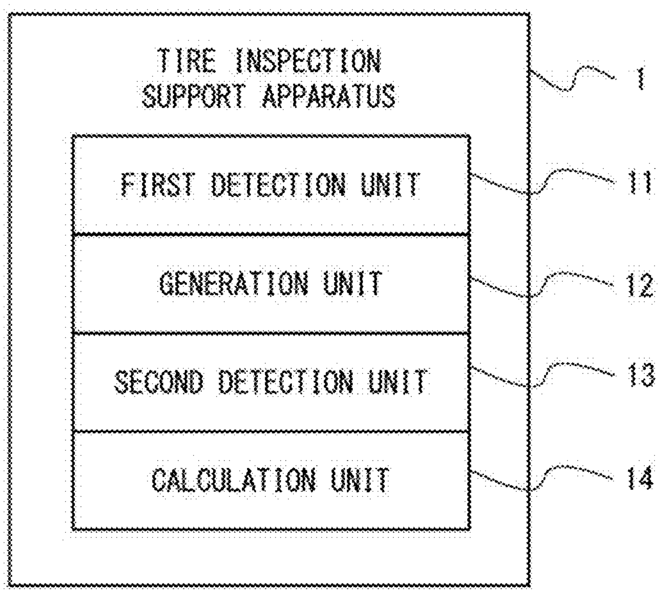
FIG. 1 is a block diagram showing a configuration of a tire inspection support apparatus according to a first example embodiment.

An example embodiment according to the present disclosure will be described in detail hereinafter with reference to the drawings. The same or corresponding elements are assigned the same reference numerals (or symbols) throughout the drawings, and redundant descriptions thereof will be omitted as appropriate for clarifying the explanation.

First Example Embodiment

FIG. 1 is a block diagram showing a configuration of a tire inspection support apparatus 1 according to a first example embodiment. The tire inspection support apparatus 1 is an information processing apparatus for supporting the inspection of a tire by detecting a cracked part in the tire from a photographed image of the tire. The tire inspection support apparatus 1 includes a first detection unit 11, a generation unit 12, a second detection unit 13 and a calculation unit 14.

The first detection unit 11 detects a first area including a cracked part candidate in a tire through first image processing performed on a photographed image of the tire. The generation unit 12 generates an image to be processed obtained by extracting a partial image corresponding to the first area from the photographed image. The second detection unit 13 detects a second area showing the cracked part from the first area through second image processing performed on the image to be processed. The calculation unit 14 calculates an index value for the cracked part in the tire based on the second area.

Figure 2:
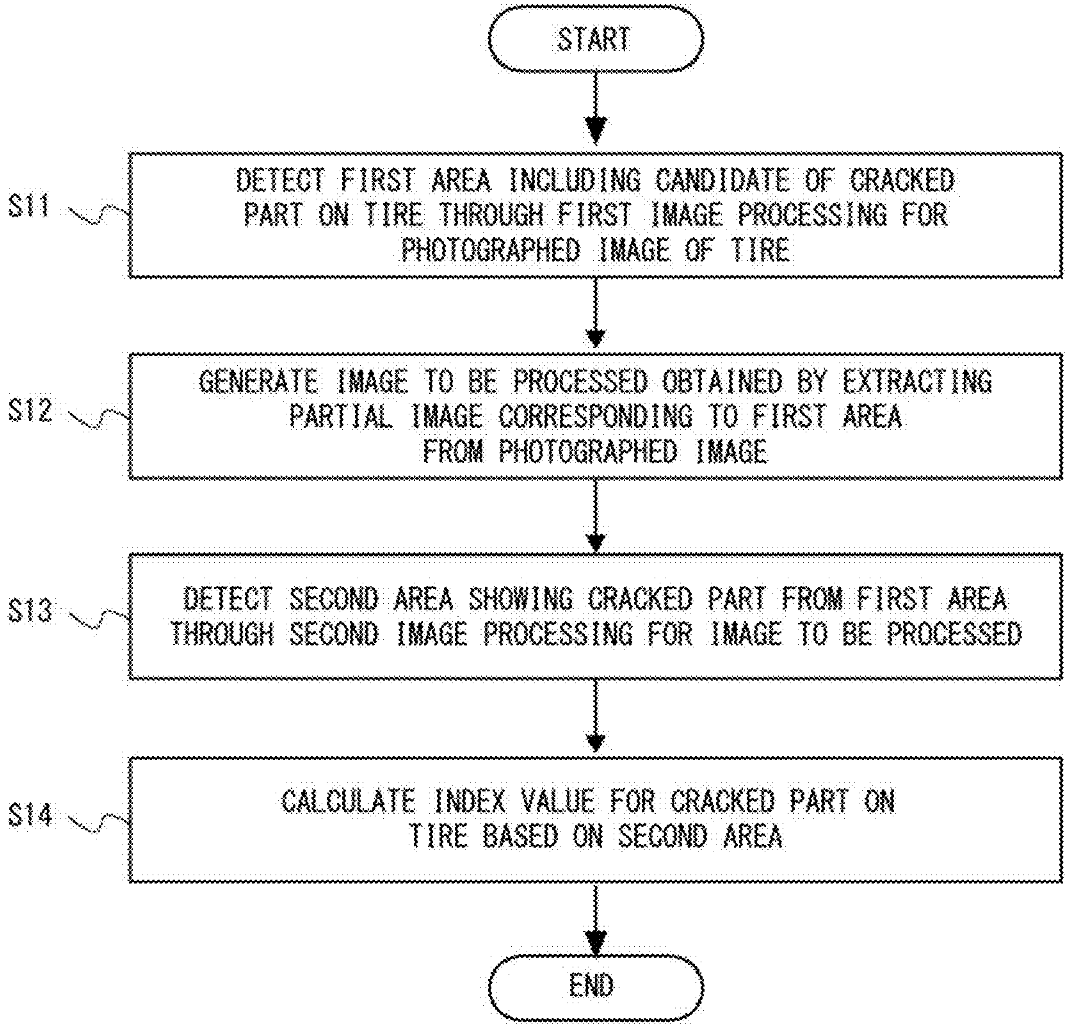
FIG. 2 is a flowchart showing a flow of a tire inspection support method according to the first example embodiment.

FIG. 2 is a flowchart showing a flow of a tire inspection support method according to the first example embodiment. Firstly, the first detection unit 11 detects a first area including a cracked part candidate in a tire through first image processing performed on a photographed image of the tire (S11). Next, the generation unit 12 generates an image to be processed obtained by extracting a partial image corresponding to the first area from the photographed image (S12). Then, the second detection unit 13 detects a second area showing the cracked part from the first area through second image processing performed on the image to be processed (S13). After that, the calculation unit 14 calculates an index value for the cracked part in the tire based on the second area (S14).

As described above, the tire inspection support apparatus 1 according to this example embodiment detects a first area including a cracked part candidate with a certain level of accuracy (first accuracy) from the photographed image of the tire through the first image processing. Then, the tire inspection support apparatus 1 performs second image processing on a partial image corresponding to the first area in the photographed image. That is, in the second image processing, image data from which the cracked part will be detected has already been narrowed down. Therefore, the tire inspection support apparatus 1 can detect the cracked part (second area) through the second image processing with second accuracy higher than the first accuracy. Further, the tire inspection support apparatus 1 calculates an index value from the second area showing the cracked part with increased accuracy by using a predetermined criterion, and thereby can provide an objective determination index in regard to whether the tire requires maintenance work or not to a user such as a mechanic. Therefore, the accuracy of the detection of a cracked part from the photographed image of the tire is improved, thus making it possible to support the inspection of the tire.

Note that the tire inspection support apparatus 1 includes, as a configuration not shown in the drawing, a processor, a memory, and a storage device. Further, in the storage device, a computer program(s) programed for implementing processes of a tire inspection support method according to this example embodiment is stored. Further, the processor loads a computer program and the like from the storage device onto the memory, and executes the loaded computer program. In this way, the processor implements the functions of the first detection unit 11, the generation unit 12, the second detection unit 13, and the calculation unit 14.

Alternatively, each component of the tire inspection support apparatus 1 may be implemented by dedicated hardware. Further, some or all of the components of apparatuses may be implemented by a general-purpose or dedicated circuitry, processor or the like, or a combination thereof. They may be configured by a single chip or by a plurality of chips connected through a bus. Some or all of the components of apparatuses may be implemented by a combination of the above-described circuitry or the like and the program. Further, a CPU (Central Processing Unit), a GPU (Graphics Processing Unit), an FPGA (Field-Programmable Gate Array), a quantum processor (quantum computer control chip) or the like may be used as a processor.

Second Example Embodiment

A second example embodiment is a specific example of the above-described first example embodiment. A problem to be solved by this example embodiment will be described hereinafter in detail. Firstly, the exhaustion of a tire includes exhaustion due to wear and that due to a crack(s). Regarding the exhaustion level due to wear, there is a specific index value in regard to the depth of grooves of a tire. Further, when the depth of grooves of a tire does not meet a threshold, the car or the like using this tire will not pass a car inspection. Therefore, a mechanic or the like can determine whether the tire requires maintenance work or not based on the objective index in regard to the depth of grooves. In contrast, the exhaustion due to a crack(s) is caused by, for example, the effect of ultraviolet rays irrespective of the distance that the car or the like has travelled using the tire, so it is difficult for at least an ordinary driver to predict such exhaustion. Further, there is no clear maintenance criterion in regard to the exhaustion level due to a crack(s). Therefore, the criterion based on which it is determined whether or not maintenance work is required because of the exhaustion due to a crack(s) in the tire differs from one mechanic to another.

Therefore, as an example, an AI (Artificial Intelligence) model is used to determine the degree of a crack in a tire by using a photographed image of the tire as its input. When doing so, the AI model is machine-trained through deep learning or the like by using photographed images of tires and results of determinations on exhaustion levels made by mechanics or the like as learning data, and then an image of a cracked part candidate can be extracted from input data of a photographed image of a tire by using the trained model.

However, there are cases where in such a trained model, an area larger than the actual cracked part is determined (detected) as an area of a cracked part. As a result, there is a problem that the accurate size and shape of the cracked part cannot be extracted (detected) when only the trained model is used. Therefore, in each of the below-described example embodiments, a technology for improving the accuracy of the detection of a cracked part in a tire from a photographed image of the tire will be described.

Figure 3:
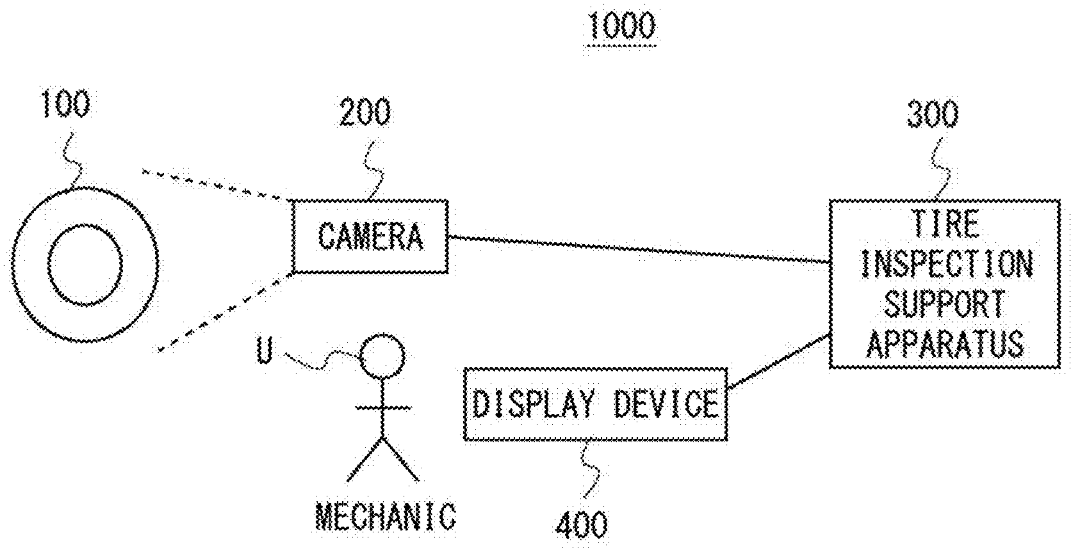
FIG. 3 is a block diagram showing a configuration of a tire inspection support system according to a second example embodiment.

FIG. 3 is a block diagram showing a configuration of a tire inspection support system 1000 according to the second example embodiment. The tire inspection support system 1000 is an information system for supporting an inspection of a tire 100 performed by a mechanic U. The tire inspection support system 1000 includes a camera 200, a tire inspection support apparatus 300, and a display device 400. The camera 200 and the tire inspection support apparatus 300 are connected to each other by a communication line. Further, the tire inspection support apparatus 300 and the display device 400 are connected to each other by a communication line. Note that the communication line may be a wired or wireless communication line or a communication network. The communication line is, for example, a LAN (Local Area Network), the Internet, a wireless communication line network, a cellular phone line network, or the like. Further, there is no restriction on the type of the communication protocol used for the communication network.

The camera 200 is a photographing apparatus by which the mechanic U photographs the tire 100 to be inspected. The camera 200 transmits a photographed image of the tire 100 to the tire inspection support apparatus 300 in response to, for example, an operation performed by the mechanic U.

The tire inspection support apparatus 300 is an example of the above-described tire inspection support apparatus 1. The tire inspection support apparatus 300 may be configured in a redundant manner over a plurality of servers, and each functional block thereof may be implemented by a plurality of computers.

The tire inspection support apparatus 300 detects a cracked part from the photographed image of the tire 100 taken by the camera 200 in two stages, and calculates an index value for the cracked part. Further, the tire inspection support apparatus 300 may determine the deterioration level of the tire from the index value. Further, the tire inspection support apparatus 300 may generate a display image by adding, to the photographed image, display information for displaying a position corresponding to the cracked part in the photographed image in such a manner that the position can be distinguished. Further, the tire inspection support apparatus 300 may output at least one of the index value, the result of the determination on the deterioration level, and the display image to the display device 400.

The display device 400 displays, on a screen, information received from the tire inspection support apparatus 300, e.g., displays at least one of the index value, the result of the determination on the deterioration level, and the display image. In this way, the mechanic U can easily determine whether the tire 100 requires maintenance work or not through the screen of the display device 400.

Figure 4:
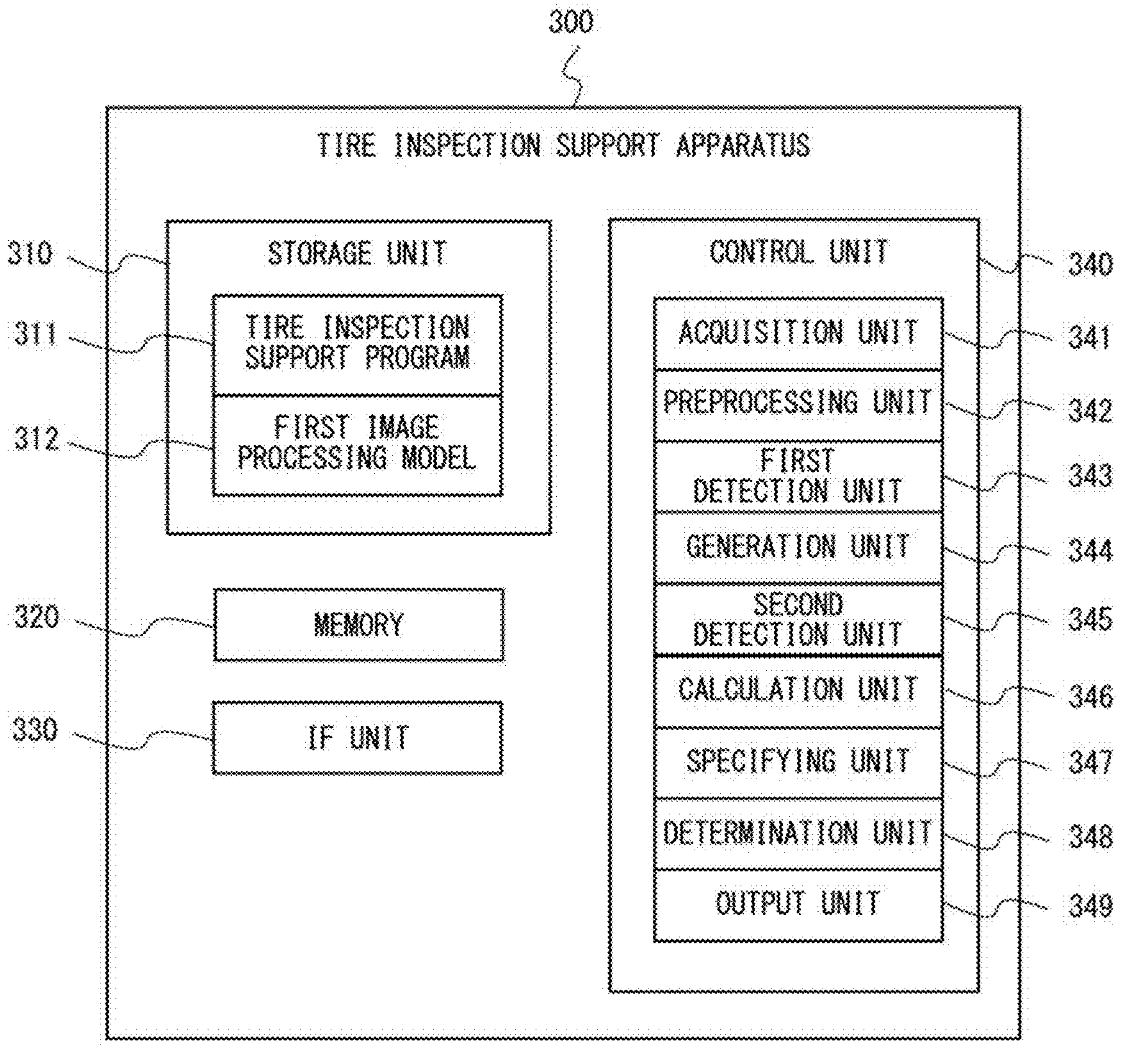
FIG. 4 is a block diagram showing a configuration of a tire inspection support apparatus according to the second example embodiment.

FIG. 4 is a block diagram showing a configuration of the tire inspection support apparatus 300 according to the second example embodiment. The tire inspection support apparatus 300 includes a storage unit 310, a memory 320, an IF (InterFace) unit 330, and a control unit 340. The storage unit 310 is an example of a storage device such as a hard disk drive or a flash memory. In the storage unit 310, a tire inspection support program 311 and a first image processing model 312 are stored. The tire inspection support program 311 is a computer program programed for implementing, for example, a tire inspection support process according to the second example embodiment. The first image processing model 312 is a module for implementing first image processing and corresponds to the above-described trained model.

The memory 320 is a volatile storage device such as a RAM (Random Access Memory) and provides a storage area for temporarily holding information when the control unit 340 operates. The IF unit 330 is a communication interface between the components or the like inside the tire inspection support apparatus 300, and the camera 200 and the display device 400.

The control unit 340 is a processor, i.e., a control apparatus that controls each component of the tire inspection support apparatus 300. The control unit 340 loads the tire inspection support program 311 and the first image processing model 312 from the storage unit 310 onto the memory 320, and executes the loaded tire inspection support program 311 and the first image processing model 312. In this way, the control unit 340 implements functions of an acquisition unit 341, a preprocessing unit 342, a first detection unit 343, a generation unit 344, a second detection unit 345, a calculation unit 346, a specifying unit 347, a determination unit 348, and an output unit 349.

The acquisition unit 341 acquires the photographed image of the tire 100 from the camera 200. That is, the acquisition unit 341 receives the photographed image as an input to the tire inspection support program 311.

The preprocessing unit 342 converts the size (the number of pixels or the like) of the photographed image to a first size, and divides the converted image into a plurality of divided photographed images each having a second size.

The first detection unit 343 is an example of the above-described first detection unit 11. The first detection unit 343 performs first image processing on the photographed image of the tire. Specifically, the first detection unit 343 performs the first image processing on the photographed image (divided photographed image) input to the tire inspection support program 311 by using the first image processing model 312, and acquires a detection result. The detection result is information indicating a first area including a cracked part candidate in the tire. The detection result is, for example, drawing data of an area determined to be a cracked part candidate or a first binary image in which a cracked part candidate is black and the other parts are white.

The generation unit 344 is an example of the above-described generation unit 12. The generation unit 344 generates an image to be processed which is a partial image corresponding to the first area, extracted from the photographed image. Specifically, the generation unit 344 generates an image to be processed by masking the areas other than the first area in the photographed image and thereby extracting a partial image. Further, the generation unit 344 may also generate a display image which is an image obtained by adding, to the photographed image, display information of a position specified by the specifying unit 347 described later. Note that the display information of the specified position is an enclosing line by which the area of interest is enclosed in the photographed image, or information or the like highlighted so that the area of interest can be distinguished.

The second detection unit 345 is an example of the above-described second detection unit 13. The second detection unit 345 performs second image processing on the image to be processed. Specifically, the second detection unit 345 performs binarization processing on the image to be processed and thereby generates a second binary image. Note that the second image processing is not limited to the binarization processing. For example, the second image processing may be a process for extracting a cracked part by using an AI model different from the one used for the first image processing, in particular, a trained model. Further, the second detection unit 345 may divide the image to be processed into a plurality of first unit areas and perform second image processing for each of the first unit areas, and by doing so, detect a second area for each of the first unit areas.

The calculation unit 346 is an example of the above-described calculation unit 14. The calculation unit 346 calculates an index value for a crack in the tire 100 based on the second area. For example, the calculation unit 346 may set a part of the image to be processed as a second unit area, slide the part by a distance shorter than the size of the second unit area, thereby setting a plurality of second unit areas in the image to be processed, and calculate an index value for each of the second unit areas. The size of the second unit area is, for example, the vertical length or the horizontal length of the second unit area. Further, the distance shorter than the size of the second unit area may be called a slide width. That is, the calculation unit 346 successively slides the second unit area, starting from an initial setting position thereof, by the slide width in the image to be processed, and thereby sets a plurality of second unit areas so that they cover the entire area in the image to be processed. Therefore, the plurality of second unit areas may overlap one another. Then, the calculation unit 346 may calculate, as an index value, a crack rate based on a ratio between the second unit area and a second area detected in the second unit area.

The specifying unit 347 is an example of the first specifying means. The specifying unit 347 specifies a second unit area corresponding to, among the index values calculated for the respective second unit areas, an index value that satisfies a predetermined condition. The predetermined condition is, for example, a condition that the index value is equal to or larger than a first predetermined value, a condition that the index value is the maximum value among the index values calculated for the respective second unit areas, or a condition that the index value is included in a predetermined number of highest ones among the index values calculated for the respective second unit areas. Further, the specifying unit 347 specifies a position in the photographed image corresponding to the specified second unit area.

The determination unit 348 determines the deterioration level of the tire 100 based on the index value. For example, the determination unit 348 determines the deterioration level based on the crack rate. Examples of the deterioration level include, but are not limited to, a multi-level value such as a value indicating large, medium, or small, a numerical value, and a percentage. Note that the determination unit 348 may determine a deterioration level for each of the second unit areas.

The output unit 349 outputs the deterioration level determined by the determination unit 348 to the display device 400. Further, the output unit 349 may output a deterioration level of each of the second unit areas. Further, the output unit 349 outputs an index value. Specifically, the output unit 349 outputs the crack rate calculated by the calculation unit 346. Further, the output unit 349 may output a crack rate in each of the second unit areas. The output unit 349 may add, to the photographed image, display information for displaying the position specified by the specifying unit 347 so that the position can be distinguished, and output the photographed image including the display information. Alternatively, the output unit 349 may output the display image generated by the generation unit 344. Alternatively, the output unit 349 may output the deterioration level and the index value while associating them with each other. Alternatively, the output unit 349 may output the deterioration level and the display information while associating them with each other. Alternatively, the output unit 349 may output the index value and the display information while associating them with each other. Alternatively, the output unit 349 may output the deterioration level, the index value, and the display information while associating them with each other.

Figure 5:
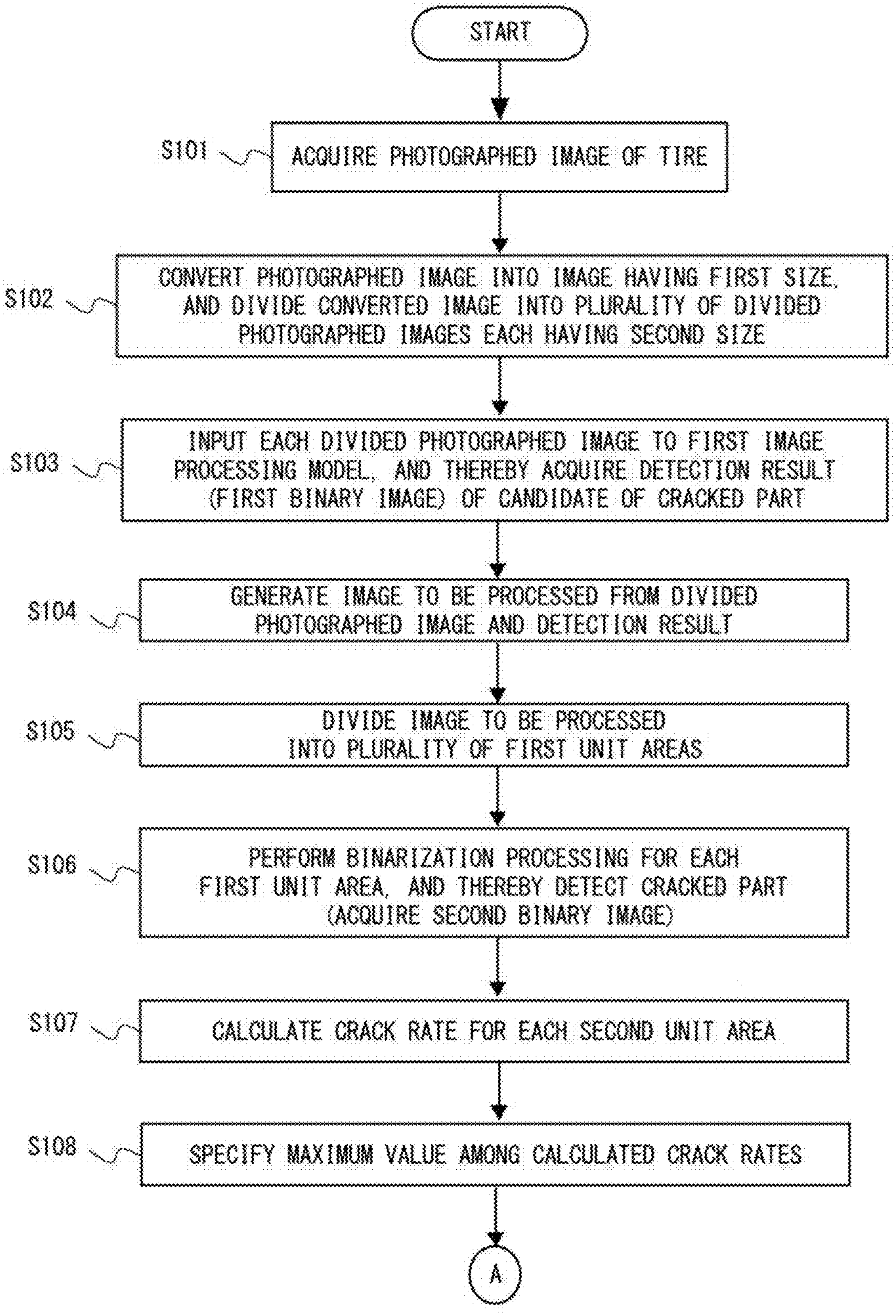
FIG. 5 is a flowchart showing a flow of a tire inspection support process according to the second example embodiment.
Figure 6:
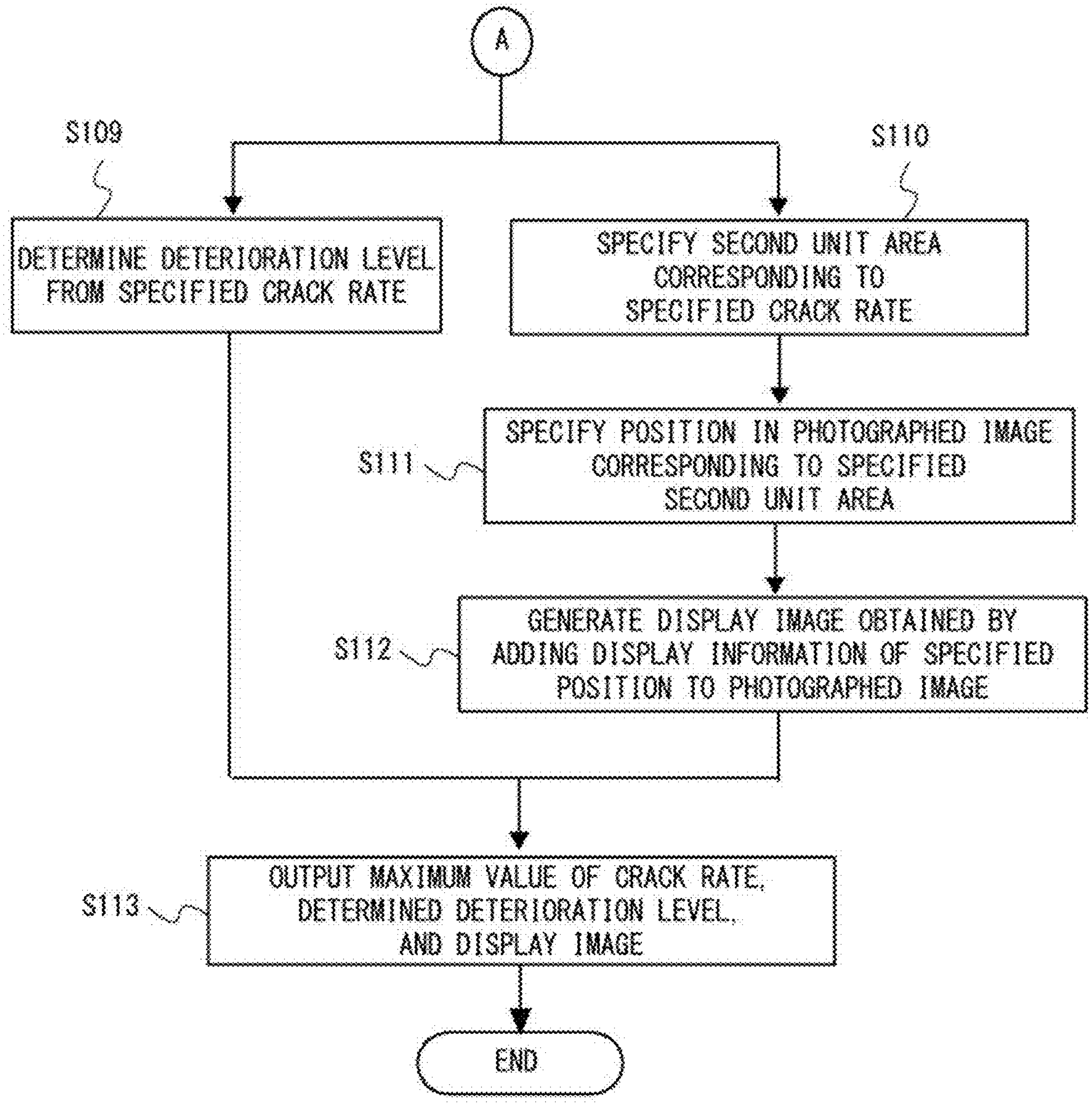
FIG. 6 is a flowchart showing the flow of the tire inspection support process according to the second example embodiment.

FIGS. 5 and 6 show a flowchart showing a flow of a tire inspection support process according to the second example embodiment. Firstly, a mechanic U photographs a tire 100 to be inspected by using the camera 200. The camera 200 transmits the photographed image of the tire 100 to the tire inspection support apparatus 300. In response to this, the tire inspection support apparatus 300 acquires the photographed image of the tire 100 (S101).

Figure 7:
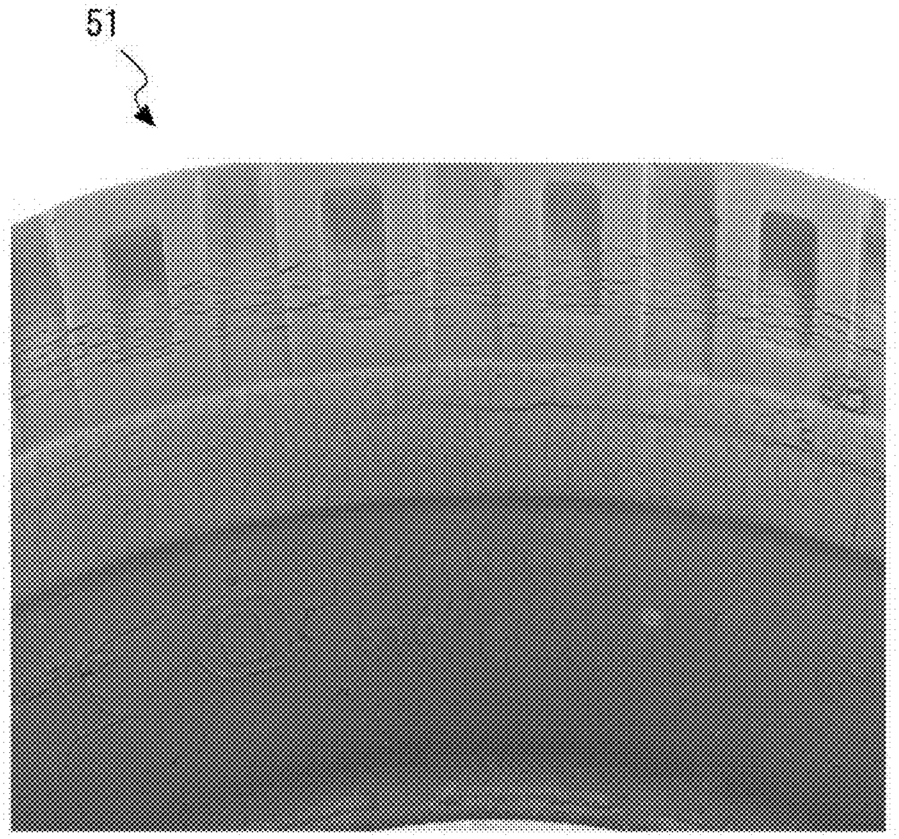
FIG. 7 shows an example of a photographed image (divided photographed image) of a tire according to the second example embodiment.

Next, the tire inspection support apparatus 300 converts the photographed image into an image having a first size, and divides the converted image into a plurality of divided photographed images each having a second size (S102). For example, the preprocessing unit 342 converts the size of the photographed image to 3,000 pixels. Then, the preprocessing unit 342 divides the converted image into images each having 500×500 pixels. However, the conversion to the first size does not necessarily have to be carried out. FIG. 7 shows an example of a photographed image (divided photographed image 51) of a tire according to the second example embodiment.

Next, the tire inspection support apparatus 300 inputs each of the divided photographed images to the first image processing model 312, and thereby acquires a detection result (first binary image) of a cracked part candidate (S103).

Figure 8:
FIG. 8 shows an example of a first binary image which is a result of detecting a cracked part candidate through first image processing model according to the second example embodiment.

FIG. 8 shows an example of a first binary image which is a detection result 52 of a cracked part candidate by the first image processing model 312 according to the second example embodiment. The first image processing model 312 outputs, as the detection result 52, information as to whether or not there is a possibility of a cracked part for each pixel in the input divided photographed image 51. The detection result 52 is an example of a binary image in which pixels of which the possibility of a cracked part is determined to be equal to or higher than a certain value are displayed in black, and pixels of which the possibility is determined to be lower than the certain value are displayed in white. A set of black pixels in the detection result 52 corresponds to the above-described first area. Note that it is assumed that the detection result 52 covers the actual cracked parts, but parts of the areas other than the cracks are also determined to be areas having the above-described possibility. That is, the detection result 52 includes a number of candidate areas of cracked parts larger than the number of actual cracked parts.

Then, the tire inspection support apparatus 300 generates an image to be processed 53 from the divided photographed image 51 and the detection result 52 (S104). For example, the generation unit 344 superimposes the divided photographed image 51 and the detection result 52 on each other, and converts the color of pixels in the divided photographed image 51 which correspond to white pixels in the detection result 52 to white. That is, while the pixel values of the pixels in the divided photographed image 51 which correspond to black pixels in the detection result 52 are unchanged, the other pixels in the divided photographed image 51 are masked to white (i.e., their color is changed to white). Note that in the above-described process, the conversion of the color of pixels in the divided photographed image 51 to white is just an example, and any of other types of conversion may be performed, provided that the converted pixels can be distinguished, in the image to be processed 53, as an area outside the area on which the second image processing will be performed. For example, the generation unit 344 may convert the opacity of the area in the divided photographed image 51, located outside the area on which the second image processing will be performed to zero, i.e., convert the opacity of the area so that the area becomes transparent.

Figure 9:
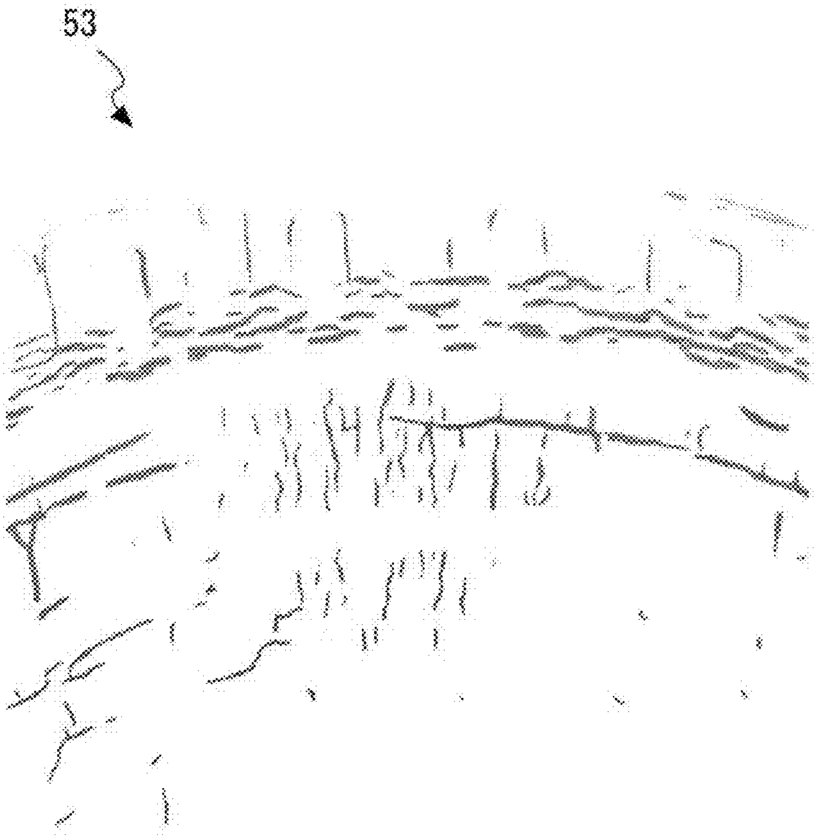
FIG. 9 shows an example of an image to be processed according to the second example embodiment.

FIG. 9 shows an example of the image to be processed 53 according to the second example embodiment. It is considered that the image to be processed 53 is an image obtained by replacing black pixels in the detection result 52 by pixels in the divided photographed image 51 corresponding thereto, i.e., by the partial image. The area of the partial image in the image to be processed 53 has various lightness/darkness levels or various colors. Meanwhile, the area other than the partial image in the image to be processed 53 is white.

Then, the tire inspection support apparatus 300 divides the image to be processed 53 into a plurality of first unit areas (S105). For example, the second detection unit 345 divides the image to be processed 53 into a grid pattern (lattice or cell) of 500×500 pixels. That is, the second detection unit 345 divides the image to be processed 53 into a plurality of first unit areas.

Figure 10:
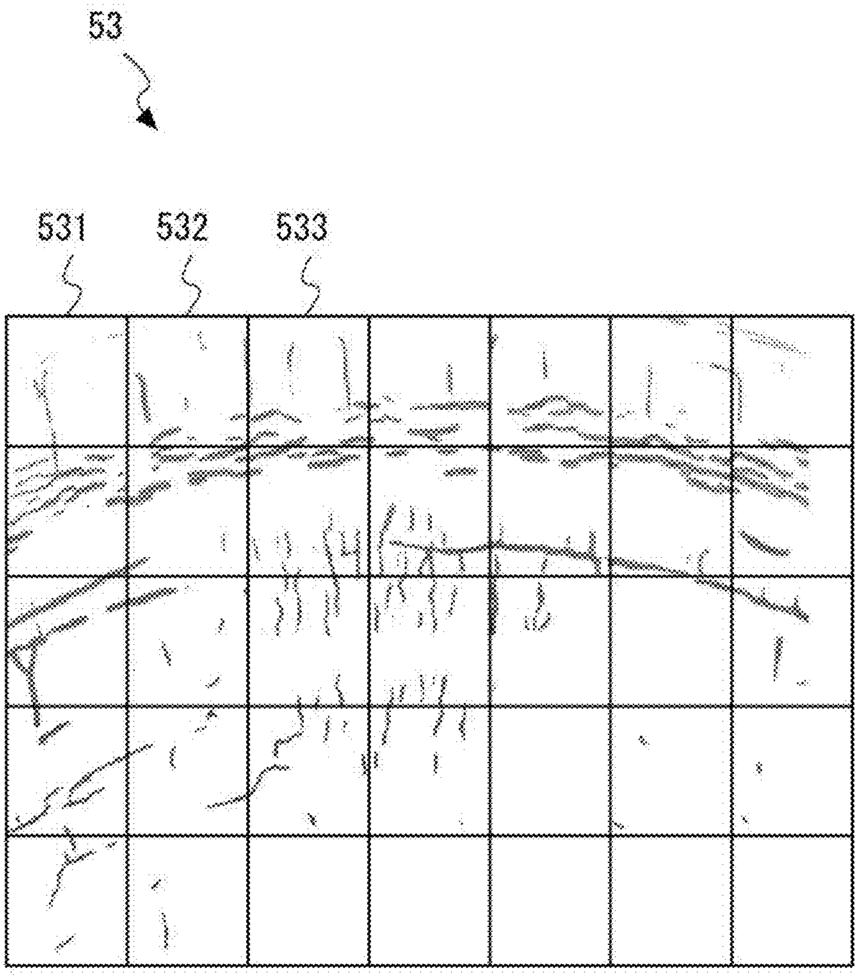
FIG. 10 shows an example in which the image to be processed according to the second example embodiment is divided into a plurality of first unit areas.

FIG. 10 shows an example in which the image to be processed 53 according to the second example embodiment is divided into a plurality of first unit areas. For example, the image to be processed 53 is divided into first unit areas 531, 532, 533, . . . . Note that although the first unit areas have the same size as each other in this example, the second detection unit 345 may divide the image to be processed 53 into areas (lattices or cells) having different sizes. Further, when the second detection unit 345 divides the image to be processed 53, it may add a margin so that there is no part (i.e., no lattice or no cell) the size of which is smaller than that of the first unit area.

Then, the tire inspection support apparatus 300 performs binarization processing for each of the first unit areas, and thereby detects a cracked part in each of them (S106). That is, the tire inspection support apparatus 300 acquires a second binary image obtained by performing binarization processing on the image to be processed 53. Specifically, the second detection unit 345 performs predetermined binarization processing for each of the first unit areas. For example, the second detection unit 345 converts, for each pixel in the first unit area 531, the color of the pixel to black when its pixel value is equal to or higher than a threshold, and converts it to white when its pixel value is lower than the threshold. Note that in the predetermined binarization processing, the threshold may be changed for each of the first unit areas.

Figure 11:
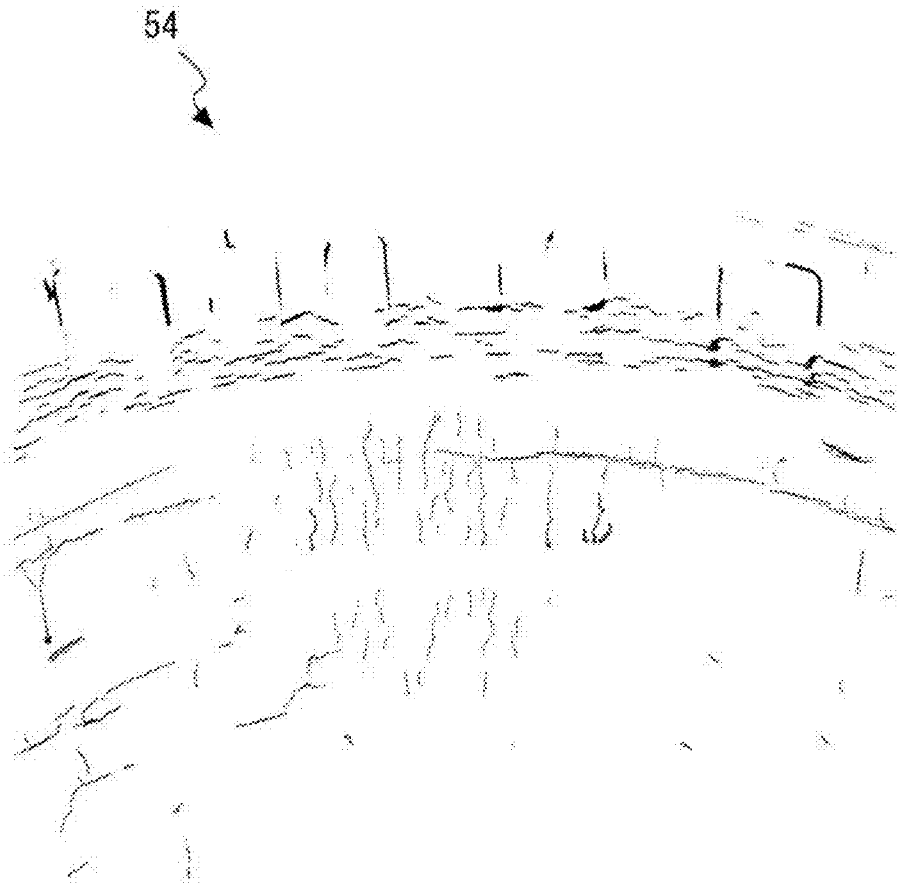
FIG. 11 shows an example of a second binary image according to the second example embodiment.

FIG. 11 shows an example of a second binary image 54 according to the second example embodiment. In the second binary image 54, a part of the partial image (first area) of the above-described image to be processed 53 has been converted to black (second area), and the rest thereof has been converted to white. The group of black pixels of the second binary image 54 can be considered to be the result of the detection of the second area. Further, the area other than the partial image (the area other than the first area) in the image to be processed 53 has originally been white, so that it is also white in the second binary image 54. Therefore, the black area (the second area) in the second binary image 54 is reduced compared with the first area in the detection result 52 (the first binary image).

After that, the tire inspection support apparatus 300 calculates a crack rate in each of the second unit areas (S107). Note that the size of the second unit area in the step S107 may be different from the size of the first unit area in the above-described step S105. Further, the tire inspection support apparatus 300 may calculate a crack rate in each of the second unit areas, each of which has a predetermined size, on the second binary image 54 while shifting the second unit area by a distance equivalent to a predetermined number of pixels. The second unit area, which is set while being shifted by a distance equivalent to a predetermined number of pixels in the step S107 as described above, is called a slide window or simply a window.

Figure 12:
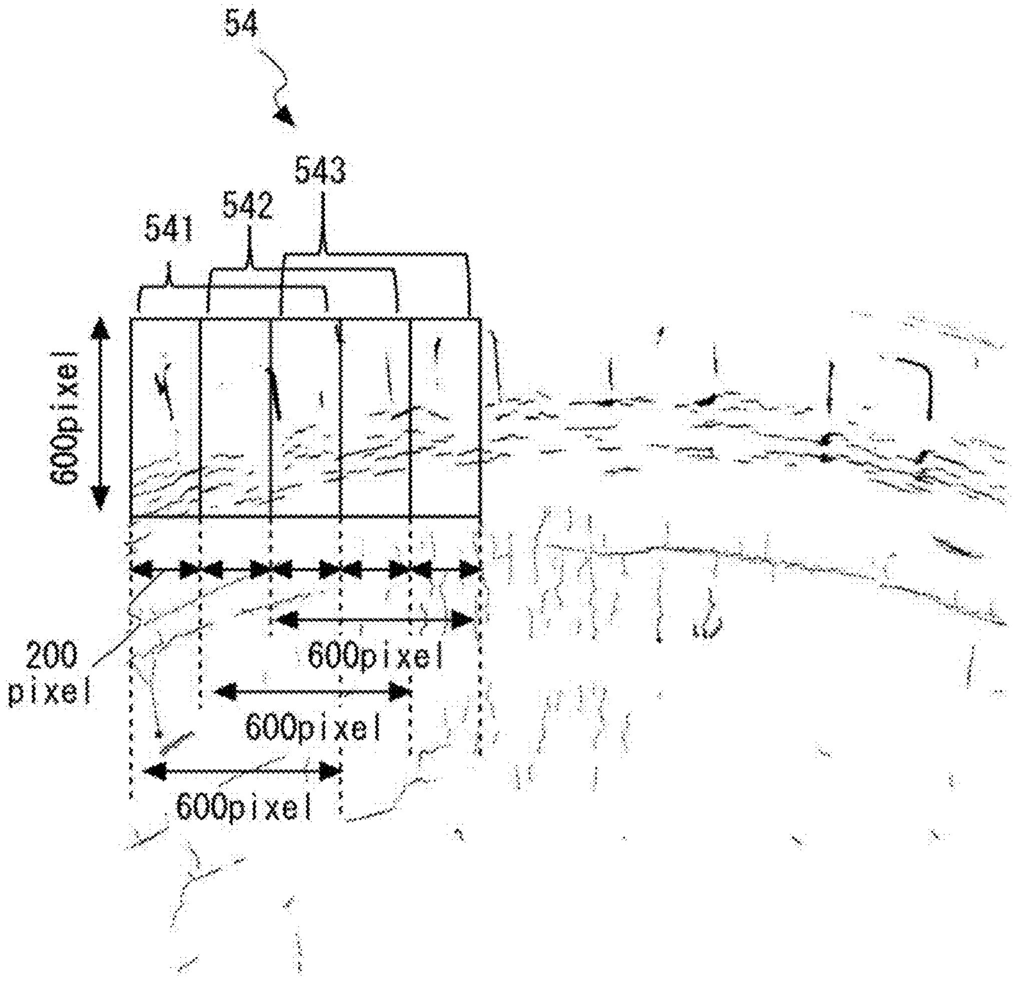
FIG. 12 shows an example of a slide window of a second binary image according to the second example embodiment.

FIG. 12 shows an example of a slide window of a second binary image 54 according to the second example embodiment. Here, it is assumed that the size of each of slide windows 541 to 543 and the like is 600 pixels in length and 600 pixels in width. Further, it is assumed that the slide width is 200 pixels. That is, it is assumed that the slide window is shifted by 200 pixels at a time.

For example, the calculation unit 346 sets the slide window 541 by using the upper left corner of the second binary image 54 as the origin. Then, the calculation unit 346 calculates a crack rate in the slide window 541. Specifically, the calculation unit 346 calculates the crack rate by dividing the number of black pixels in the slide window 541 by the size of the slide window 541. Next, the calculation unit 346 sets the slide window 542 by sliding the left end of the slide window 541 to the right by 200 pixels. Therefore, a right-end area of the slide window 541 having a width of 400 pixels overlaps with a left-end area of the slide window 542 having a width of 400 pixels. Then, the calculation unit 346 calculates a crack rate in the slide window 542. Next, the calculation unit 346 sets the slide window 543 by sliding the left end of the slide window 542 to the right by 200 pixels. Therefore, a right-end area of the slide window 541 having a width of 200 pixels overlaps with a left-end area of the slide window 543 having a width of 200 pixels. Further, a right-end area of the slide window 542 having a width of 400 pixels overlaps with a left-end area of the slide window 543 having a width of 400 pixels. Then, the calculation unit 346 calculates a crack rate in the slide window 543.

As described above, the calculation unit 346 slides, from the left end of the uppermost row of the second binary image 54 to the right end thereof, the slide window by a slide width shorter than the crosswise length of the slide window at a time, and thereby successively sets slide windows, and calculates a crack rate in each of the slide windows. Next, the calculation unit 346 slides the slide window from the uppermost row of the second binary image 54 by a slide width shorter than the lengthwise length of the slide window, and thereby sets a slide window. For example, the calculation unit 346 slides the slide window downward from the slide window 541 by 200 pixels and thereby sets the leftmost slide window in the second row, and calculates a crack rate in this slide window. After that, the calculation unit 346 calculates a crack rate in each of slide windows one after another from the leftmost slide window to the rightmost slide window in the second row of the second binary image 54, and eventually calculates crack rates up to the rightmost slide window in the lowermost row. Note that the size of the slide window, the order of slide windows, the slide width, and the like are not limited to the above-described examples.

After that, the tire inspection support apparatus 300 specifies the maximum value among the calculated crack rates (S108). Specifically, for example, the specifying unit 347 specifies the maximum crack rate among the crack rates of all the slide windows including the slide window 541 and the like.

Then, the tire inspection support apparatus 300 determines a deterioration level from the specified crack rate (S109). Specifically, the determination unit 348 determines (i.e., selects) one of a plurality of multi-level values according to the crack rate, and defines the result of the determination as the deterioration level. For example, the determination unit 348 determines the deterioration level as "Low" when the crack rate is lower than 2.5%, determines the deterioration level as "Medium" when the crack rate is not lower than 2.5% and lower than 4.2%, and determines the deterioration level as "High" when the crack rate is 4.2% or higher.

Further, the tire inspection support apparatus 300 specifies, independently of the step S109, a unit area corresponding to the specified crack rate (S110). That is, the specifying unit 347 specifies a slide window corresponding to the maximum crack rate. Then, the tire inspection support apparatus 300 specifies a position in the photographed image corresponding to the specified unit area (S111). Then, the tire inspection support apparatus 300 generates a display image obtained by adding display information of the specified position to the photographed image (S112). For example, the generation unit 344 uses a red enclosing line by which the area corresponding to the specified position is enclosed in the divided photographed image 51 as display information. Then, the generation unit 344 generates a display image by adding the display information to the area of interest on the divided photographed image 51.

After the steps S109 and S112, the tire inspection support apparatus 300 outputs the maximum value of the crack rate, the determined deterioration level, and the display image to the display device 400 (S113). Note that the tire inspection support apparatus 300 may further output a support message corresponding to the deterioration level. In response to this, the display device 400 displays, on a screen, the maximum value of the crack rate, the determined deterioration level, and the display image received from the tire inspection support apparatus 300.

Figure 13:
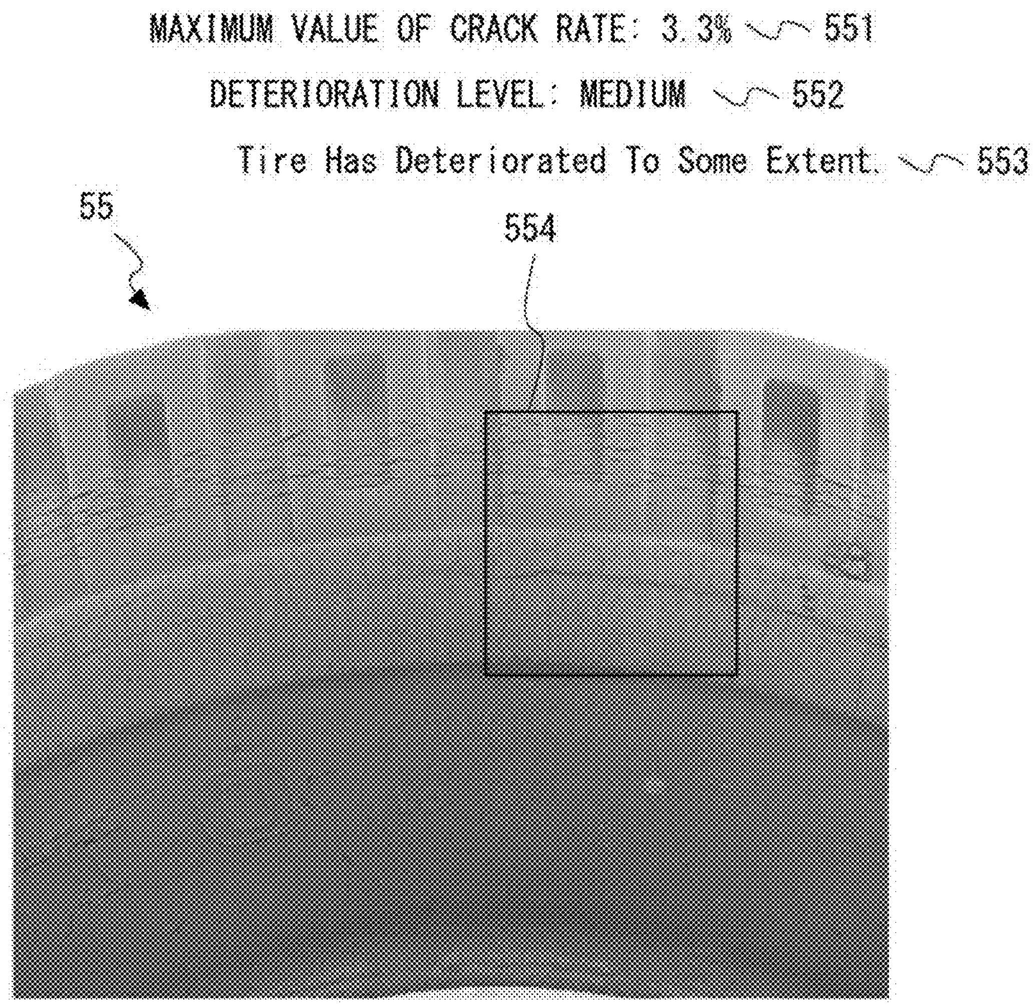
FIG. 13 shows an example of a photographed image (displayed image) in which a crack rate, a deterioration level, and display information are added according to the second example embodiment.

FIG. 13 shows an example of a photographed image (display image 55) in which a crack rate, a deterioration level, and display information are added according to the second example embodiment. That is, FIG. 13 is an example in which a crack rate, a deterioration level, and display information are displayed while being associated with each other. The display image 55 shows an example in which display information 554 is added to the above-described area corresponding to the specified position in the divided photographed image 51. Note that the color of the enclosing line of the display information 554 may be red. However, the color is not limited to red and may be any color by which the area of interest can be easily distinguished. Further, in addition to or instead of the color, other display methods or forms by which the area of interest can be easily distinguished, such as bold lines and dashed lines, may be used. Further, the maximum value 551 of the crack rate indicates that the crack rate in the area indicated by the display information 554 is 3.3%. A deterioration level 552 indicates that the deterioration level is determined to be "Medium" according to the maximum value 551 of the crack rate. Further, a support message 553 is an example of a message for a mechanic U, determined according to the deterioration level 552. In this example, since the deterioration level 552 is "Medium", an example of a message "Tire Has Deteriorated To Some Extent" is shown as the support message 553. The maximum value 551 of the crack rate, the deterioration level 552, the support message 553, and the display information 554 make it easier for the mechanic U to determine that the tire 100 requires maintenance work. That is, the tire inspection support apparatus 300 provides an objective determination index in regard to whether the tire 100 requires maintenance work or not to the mechanic U, and therefore can support the inspection of the tire.

As described above, when an index value is calculated from a second binary image, the second binary image is scanned (i.e., successively defined and checked) while shifting the slide window having a predetermined size by a slide width shorter than the window width. In this way, it is possible to determine the position of the maximum crack rate with increased accuracy than in the case where the second binary image is simply divided into a grid pattern (into first unit areas) and the index value is calculated for each cell (or lattice) of the grid pattern (i.e., for each unit area). For example, as shown as the display information 554 in FIG. 13, it is possible to specify the position which cannot be specified when the image is simply divided into a grid pattern (lattice or cell).

Further, the first detection unit 343 detects a candidate area (first area) of a cracked part from a photographed image of a tire by using first image processing model 312 that has already been trained through deep learning. However, regarding the candidate area of the cracked part detected by using the first image processing model 312, the cracked part tends to be detected thicker than the actual cracked part. Therefore, in this example embodiment, the generation unit 344 masks the area other than the first area in the divided photographed image 51 and thereby generates the image to be processed 53 in which the partial image of the first area remains. Then, the second detection unit 345 can narrow down the actual cracked part in the partial image by performing binarization processing on the image to be processed 53. That is, in this example embodiment, the process for detecting a cracked part is performed in two stages, so that the shape of a crack(s) can be detected in a detailed manner.

Further, there is unevenness in the brightness of the image to be processed 53 obtained by performing the masking in the photographed image of the tire. Therefore, if the whole image is binarized in a collective manner, there is a limit on the improvement of the accuracy of the narrowing-down of the cracked part. Therefore, in this example embodiment, the image to be processed 53 is divided into a plurality of unit areas and binarization is performed for each of the unit areas, so that the analysis can be performed in a detailed manner and hence the accuracy of the detection can be improved. In particular, by adjusting the threshold used in the binarization for each of the unit areas, it is possible improve the accuracy of the detection while taking the unevenness in the brightness into consideration. Note that the second detection unit 345 may perform second image processing other than the binarization processing.

Further, in this example embodiment, an area corresponding to the maximum value of the crack rate is specified, and is indicated and displayed in the photographed image. Therefore, a mechanic U can visually and easily recognize a part of the tire 100 to be inspected which has deteriorated more than any of the other parts of the tire 100, and thereby can easily determine whether maintenance work is necessary or not. This is because a tire is one integrated component, so that if there is a large crack even in only one place, the tire itself needs to be replaced.

Other Example Embodiment

Note that although the binarization processing is performed and a crack rate is calculated after the image to be processed 53 is divided into a plurality of unit areas in the above-described second example embodiment, the present disclosure is not limited to this example. For example, the second detection unit 345 may detect a second area by performing binarization processing on the whole image to be processed 53 without dividing the image to be processed 53. In such a case, the calculation unit 346 preferably calculates a crack rate as an index value based on a ratio between the photographed image (divided photographed image 51) and the second area (i.e., number of pixels belonging to the second area).

Further, although display information is added to the unit area corresponding to the maximum value of the crack rate in the above-described second example embodiment, the present disclosure is not limited to this example. For example, the specifying unit 347 may specify two or more positions in the photographed image corresponding respective second areas. In such a case, the output unit 349 preferably adds, in the photographed image, a plurality of pieces of display information for displaying a plurality of specified positions, respectively, so that these positions can be distinguished, and output the photographed image including these pieces of display information. Further, although the above-described example embodiments have been described by using a crack in a tire as an object to be detected, the technology according to the present disclosure may be applied to a crack in an article or a structure other than the tire (such as a road, a bridge, and a building).

In the above-described examples, the program includes a set of instructions (or software codes) that, when being loaded into a computer, causes the computer to perform one or more of the functions described in the example embodiments. The program may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disc (DVD), a Blu-ray (registered trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

Note that the present disclosure is not limited to the above-described example embodiments and various changes may be made therein without departing from the spirit and scope of the present disclosure. Further, the present disclosure may be implemented by combining example embodiments with one another.

The whole or part of the example embodiments disclosed above can be described as, but not limited to, the following Supplementary note.

(Supplementary Note A1)

A tire inspection support apparatus comprising:

first detection means for detecting a first area including a cracked part candidate in a tire through first image processing performed on a photographed image of the tire;

generation means for generating an image to be processed obtained by extracting a partial image corresponding to the first area from the photographed image;

second detection means for detecting a second area showing the cracked part from the first area through second image processing performed on the image to be processed; and calculation means for calculating an index value for the cracked part in the tire based on the second area.

(Supplementary Note A2)

The tire inspection support apparatus described in Supplementary note A1, wherein the second detection means performs binarization processing on the image to be processed as the second image processing.

(Supplementary Note A3)

The tire inspection support apparatus described in Supplementary note A1 or A2, further comprising:

determination means for determining a deterioration level of the tire based on the index value; and first output means for outputting the deterioration level.

(Supplementary Note A4)

The tire inspection support apparatus described in any one of Supplementary notes A1 to A3, further comprising second output means for outputting the index value.

(Supplementary Note A5)

The tire inspection support apparatus described in any one of Supplementary notes A1 to A4, wherein the generation means generates the image to be processed by masking an area other than the first area in the photographed image and thereby extracting the partial image.

(Supplementary Note A6)

The tire inspection support apparatus described in any one of Supplementary notes A1 to A5, wherein the second detection means divides the image to be processed into a plurality of first unit areas and detects the second area in each of the first unit areas by performing the second image processing on each of the first unit areas, and the calculation means sets a part of the image to be processed as a second unit area, slides the part by a distance shorter than a size of the second unit area, thereby setting a plurality of second unit areas in the image to be processed, and calculates an index value for each of the second unit areas.

(Supplementary Note A7)

The tire inspection support apparatus described in Supplementary note A6, further comprising:

first specifying means for specifying the second unit area corresponding to, among index values calculated for respective second unit areas, an index value that satisfies a predetermined condition, and specifying a position in the photographed image corresponding to the specified second unit area; and third output means for adding, in the photographed image, display information for displaying the specified position so that the position can be distinguished, and outputting the photographed image including the display information.

(Supplementary Note A8)

The tire inspection support apparatus described in Supplementary note A7, wherein the predetermined condition is a condition that the index value be a maximum value among the index values calculated for the respective second unit areas.

(Supplementary Note A9)

The tire inspection support apparatus described in any one of Supplementary notes A6 to A8, wherein the calculation means calculates a crack rate as the index value based on a ratio between the second unit area and the second area detected in the second unit area.

(Supplementary Note A10)

The tire inspection support apparatus described in any one of Supplementary notes A1 to A5, wherein the calculation means calculates a crack rate as the index value based on a ratio between the photographed image and the second area.

(Supplementary Note A11)

The tire inspection support apparatus described in any one of Supplementary notes A1 to A5 and A10, further comprising:

second specifying means for specifying a position in the photographed image corresponding to the second area; and fourth output means for adding, in the photographed image, display information for displaying the specified position so that the position can be distinguished, and outputting the photographed image including the display information.

(Supplementary Note B1)

A tire inspection support method, in which a computer:

detects a first area including a cracked part candidate in a tire through first image processing performed on a photographed image of the tire;

generates an image to be processed obtained by extracting a partial image corresponding to the first area from the photographed image;

detects a second area showing the cracked part from the first area through second image processing performed on the image to be processed; and calculates an index value for the cracked part in the tire based on the second area.

(Supplementary Note C1)

A non-transitory computer readable medium storing an inspection support program for causing a computer to perform:

a first detection process for detecting a first area including a cracked part candidate in a tire through first image processing performed on a photographed image of the tire;

a generation process for generating an image to be processed obtained by extracting a partial image corresponding to the first area from the photographed image;

a second detection process for detecting a second area showing the cracked part from the first area through second image processing performed on the image to be processed; and a calculation process for calculating an index value for the cracked part in the tire based on the second area.

Although the present invention has been described with reference to example embodiments (and examples), the present invention is not limited to the above-described example embodiments (and examples). The configuration and details of the present invention may be modified within the scope of the present invention in various ways that can be understood by those skilled in the art.

REFERENCE SIGNS LIST

1 TIRE INSPECTION SUPPORT APPARATUS
11 FIRST DETECTION UNIT
12 GENERATION UNIT
13 SECOND DETECTION UNIT
14 CALCULATION UNIT
1000 TIRE INSPECTION SUPPORT SYSTEM
100 TIRE
200 CAMERA
300 TIRE INSPECTION SUPPORT APPARATUS
310 STORAGE UNIT
311 TIRE INSPECTION SUPPORT PROGRAM
312 FIRST IMAGE PROCESSING MODEL
320 MEMORY
330 IF UNIT
340 CONTROL UNIT
341 ACQUISITION UNIT
342 PREPROCESSING UNIT
343 FIRST DETECTION UNIT
344 GENERATION UNIT
345 SECOND DETECTION UNIT
346 CALCULATION UNIT
347 SPECIFYING UNIT
348 DETERMINATION UNIT
349 OUTPUT UNIT
400 DISPLAY APPARATUS
U MECHANIC
51 DIVIDED PHOTOGRAPHED IMAGE
52 DETECTION RESULT
53 IMAGE TO BE PROCESSED
531 FIRST UNIT AREA
532 FIRST UNIT AREA
533 FIRST UNIT AREA
54 SECOND BINARY IMAGE
541 SLIDE WINDOW
542 SLIDE WINDOW
543 SLIDE WINDOW
55 DISPLAY IMAGE
551 MAXIMUM VALUE OF CRACK RATE
552 DETERIORATION LEVEL
553 SUPPORT MESSAGE
554 DISPLAY INFORMATION

What is claimed is:

1. A tire inspection support apparatus comprising:

at least one storage device configured to store instructions; and at least one processor configured to execute the instructions to:

detect a first area including a cracked part candidate in a tire through first image processing performed on a photographed image of the tire;

generate an image to be processed obtained by extracting a partial image corresponding to the first area from the photographed image;

detect a second area showing the cracked part from the first area through second image processing performed on the image to be processed;

calculate an index value for the cracked part in the tire based on the second area;

wherein the second image processing is binarization;

wherein the detecting a second area comprises dividing the partial image corresponding to the first area into multiple overlapping slide windows and identifying black pixels within each slide window; and wherein calculating the index value comprises counting a number of black pixels within each slide window and dividing the number of black pixels within each slide window by the size of the slide window.

2. The tire inspection support apparatus according to claim 1 wherein the at least one processor is further configured to execute the instructions to:

determine a deterioration level of the tire based on the index value; and output the deterioration level.

3. The tire inspection support apparatus according to claim 1, wherein the at least one processor is further configured to execute the instructions to:

output the index value.

4. The tire inspection support apparatus according to claim 1, wherein the at least one processor is further configured to execute the instructions to:

generate the image to be processed by masking an area other than the first area in the photographed image and thereby extract the partial image.

5. The tire inspection support apparatus according to claim 1, wherein the at least one processor is further configured to execute the instructions to:

specify the second unit area corresponding to, among index values calculated for respective second unit areas, an index value that satisfies a predetermined condition, and specify a position in the photographed image corresponding to the specified second unit area; and add, in the photographed image, display information for displaying the specified position so that the position can be distinguished, and output the photographed image including the display information.

6. The tire inspection support apparatus according to claim 5, wherein the predetermined condition is a condition that the index value be a maximum value among the index values calculated for the respective second unit areas.

7. The tire inspection support apparatus according to claim 1, wherein the at least one processor is further configured to execute the instructions to:

specify a position in the photographed image corresponding to the second area; and add, in the photographed image, display information for displaying the specified position so that the position can be distinguished, and output the photographed image including the display information.

8. A tire inspection support method, in which a computer:

detects a first area including a cracked part candidate in a tire through first image processing performed on a photographed image of the tire;

generates an image to be processed obtained by extracting a partial image corresponding to the first area from the photographed image;

detects a second area showing the cracked part from the first area through second image processing performed on the image to be processed;

calculates an index value for the cracked part in the tire based on the second area-;

wherein the second image processing is binarization;

wherein the detecting a second area comprises dividing the partial image corresponding to the first area into multiple overlapping slide windows and identifying black pixels within each slide window; and wherein calculating the index value comprises counting a number of black pixels within each slide window and dividing the number of black pixels within each slide window by the size of the slide window.

9. A non-transitory computer readable medium storing an inspection support program for causing a computer to perform:

a first detection process for detecting a first area including a cracked part candidate in a tire through first image processing performed on a photographed image of the tire;

a generation process for generating an image to be processed obtained by extracting a partial image corresponding to the first area from the photographed image;

a second detection process for detecting a second area showing the cracked part from the first area through second image processing performed on the image to be processed;

a calculation process for calculating an index value for the cracked part in the tire based on the second area;

wherein the second image processing is binarization;

wherein the detecting a second area comprises dividing the partial image corresponding to the first area into multiple overlapping slide windows and identifying black pixels within each slide window; and wherein calculating the index value comprises counting a number of black pixels within each slide window and dividing the number of black pixels within each slide window by the size of the slide window.

* * * * *